United States Patent [19]

Heim

[11] Patent Number: 5,533,941
[45] Date of Patent: Jul. 9, 1996

[54] BELT AND METHOD OF MANUFACTURE

[75] Inventor: William D. Heim, Easton, Pa.

[73] Assignee: Belting Industries Co., Inc., Kenilworth, N.J.

[21] Appl. No.: 389,415

[22] Filed: Feb. 16, 1995

[51] Int. Cl.$^6$ .................................................. F16G 1/04
[52] U.S. Cl. .................. 474/267; 156/229; 264/288.8; 474/268
[58] Field of Search ................................ 474/266–268; 156/229; 264/288.8

[56] References Cited

U.S. PATENT DOCUMENTS

| | | | |
|---|---|---|---|
| 3,915,202 | 10/1975 | Curtis et al. | 139/425 A |
| 4,407,333 | 10/1983 | Fowkes | 474/267 X |
| 4,552,620 | 11/1985 | Adams | 162/358 |
| 4,559,258 | 12/1985 | Kiuchi | 428/156 |
| 4,604,310 | 8/1986 | Bertotto | 428/36 |
| 5,004,098 | 4/1991 | Marshall | 198/847 |
| 5,119,938 | 6/1992 | Beckh et al. | 198/847 |
| 5,171,389 | 12/1992 | Stigberg | 156/165 |
| 5,238,537 | 8/1993 | Dutt | 162/358.4 |
| 5,277,728 | 1/1994 | Stigberg | 156/154 |
| 5,302,251 | 4/1994 | Schiel et al. | 162/358.4 |

FOREIGN PATENT DOCUMENTS 60-88193  5/1985  Japan.

*Primary Examiner*—Roger J. Schoeppel
*Attorney, Agent, or Firm*—Richard C. Litman

[57] ABSTRACT

A belt includes a bilayer of amorphous, synthetic material and a heat fused, resin-impregnated, underlying bilayer of woven fabric. The belt is molded to have a desired profile. The belt avoids loss of tension and exhibits tensile strength along both its length and breadth. A method of manufacture includes molding the layers and profile in a single process in such a way that a single set of molds can be used for molding a desired profile in a belt of a variety of lengths.

17 Claims, 3 Drawing Sheets

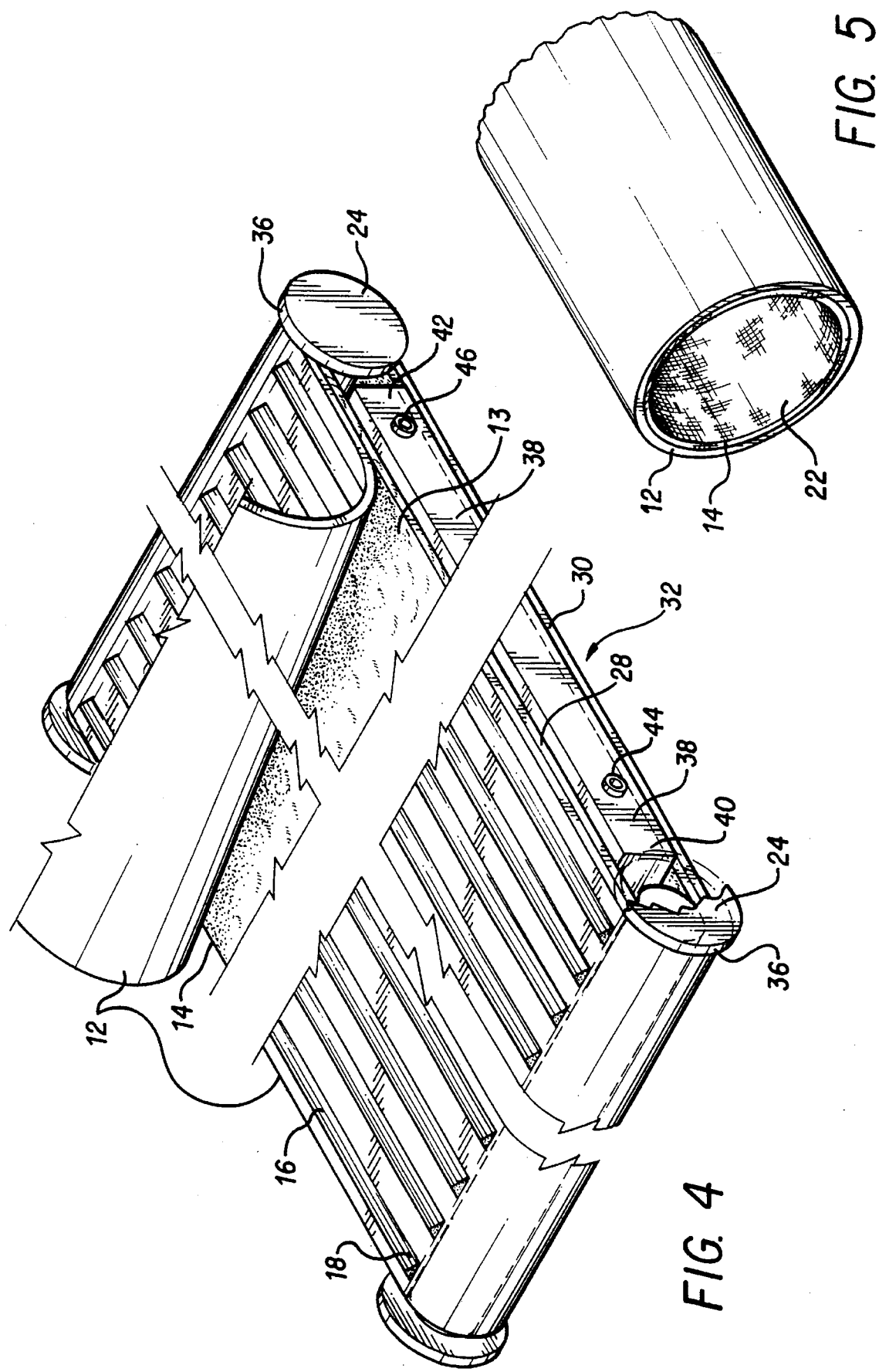

BELT AND METHOD OF MANUFACTURE

BACKGROUND OF THE INVENTION

1. Field of the Invention

The present invention relates generally to methods for manufacturing belts, and more specifically to methods for manufacturing endless, molded belts in a single process.

2. Description of the Prior Art

Belts are frequently used in a variety of manufacturing processes for driving parts of machinery, including other belts. In order for belts to operate correctly, they must track properly on the pulleys. In paper handling machines, improper belt tracking could cause paper jam-ups. Several methods for guiding belts have been developed. Because of space limitations in machinery, some such methods, including belt-tracking devices are unsatisfactory.

Often, the most desirable method of tracking a flat belt is the use of crowned pulleys. When pulley crowning proves ineffective, molded profiles on the belt for the purpose of tracking can be very effective. However, prior to applicant's invention, there was only one variety of flat, guided belt that was readily available. Unsupported rubber belts do not require a pulley take-up and can be used with a range of molded profiles. However, the unsupported belt has proven unacceptable for any high-tension application, for the reason that such a belt quickly loses its tension when configured in the narrow widths and minimal thicknesses required in many machines. Woven, endless belts do not exhibit the tension-loss that unsupported rubber belts do. However, easily manufactured, woven, endless belts have previously been unavailable with molded profiles for tracking.

Numerous efforts have been made to improve belts for use in machinery. U.S. Pat. No. 4,407,333, issued to Robert A. Fowkes on Oct. 4, 1983, describes a weaving pattern for belting fabric. The patent does not discuss applying synthetic layer to fabric or molding guiding profile into a belt.

U.S. Pat. No. 4,552,620, issued to Richard J. Adams on Nov. 12, 1985, describes a fabric with a sprayed-on urethane coating. The patent does not provide for simultaneous molding of a tracking profile.

U.S. Pat. No. 4,559,258, issued to Masao Kiuchi, on Dec. 17, 1985, describes a fabric with a synthetic coating on both sides. The patent provides for simultaneous molding of drain channels, but does not provide for simultaneous molding of a tracking profile. Additionally, the patent does not suggest the use of an endless sleeve of amorphous, synthetic material outside of a fabric sleeve. Because of this lacking, there is inadequate material in which to mold an effective tracking guide of the nature disclosed in the present invention.

U.S. Pat. No. 4,604,310, issued to Serafino Bertotto, on Aug. 5, 1986, describes a belt comprised by a layer of woven cotton and a layer of woven synthetic material. The two layers are bonded by needling, rather than by heat fusion. There is no teaching of molded tracking profiles.

U.S. Pat. No. 5,171,389, issued to Carl E. Stigberg, on Dec. 15, 1992, describes a method of making a grooved belt by applying a grooved ribbon of synthetic material to a previously manufactured belt comprised by polymeric-resin-impregnated fabric. The patent thus teaches away from the concept of molding tracking profiles in a belt in the same process in which the belt is manufactured.

U.S. Pat. No. 5,238,537, issued to William H. Dutt, on Aug. 24, 1993, describes a belt of a resin-impregnated fabric that can be manufactured to any length because it does not require use of a mandrel. There is no teaching in the patent regarding the molding of tracking profiles in belts.

U.S. Pat. No. 5,277,728, issued to Carl E. Stigberg, on Jan. 11, 1994, describes a polyurethane-coated fabric belt. An additional fibrous material is disposed on the coating. There is no teaching of molding of guide profiles.

U.S. Pat. No. 5,302,251, issued to Christian Schiel, et al., on Apr. 12, 1994, describes a press jacket including a belt with lubricant-retaining grooves. The formation of the grooves results from swelling of longitudinal threads in the belt. There is no teaching of molding of guide profiles.

Japanese Patent 60-88193, issued on Sep. 19, 1983 to Beloit Corp., describes an annular blanket made of woven fabric and coated, as by spraying, with polyurethane. The coating has pores, but there is no teaching of molding guide tracks in the blanket.

None of the above inventions and patents, taken either singly or in combination, is seen to describe the instant invention as claimed.

SUMMARY OF THE INVENTION

The present invention includes a belt comprising a bilayer of amorphous, synthetic material and a resin-impregnated, underlying bilayer of woven fabric. The belt is molded to have a desired profile. The belt avoids loss of tension and exhibits tensile strength along both its length and breadth. A method of manufacture according to the present invention comprises molding the layers and profile in a single process in such a way that a single sets of molds can be used for molding a desired profile in a belt of a variety of lengths.

Accordingly, it is a principal object of the invention to provide a belt with guide profiles, having minimal width and thickness, yet capable of maintaining its original tension despite heavy use.

It is another object of the invention to provide quick and easy molding of a wide variety of profiles on belts.

It is a further object of the invention to provide a method allowing molding of a profile on belts of a variety of lengths, with only one set of molds.

Still another object of the invention is to replace standard wound-yarn mold-core supports with woven fabric, thereby providing strength in two directions instead of only one.

It is a yet another object of the invention to provide a method for holding fabric to be incorporated in a belt in a proper orientation that cannot be distorted by the molding process.

Yet a further object of the invention is to provide a method allowing molded belt manufacture with equipment that is less expensive than that used for core molding.

Still a further object of the invention is to provide a method allowing molding of various profiles in a woven belt in a single process.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 4 is a partial perspective view of a partially molded belt in position on the device according to the present invention.

FIG. 5 is a partial perspective view of a woven sleeve inside a synthetic rubber sleeve.

Similar reference characters denote corresponding features consistently throughout the attached drawings.

DETAILED DESCRIPTION OF THE PREFERRED EMBODIMENTS

Figure 1:
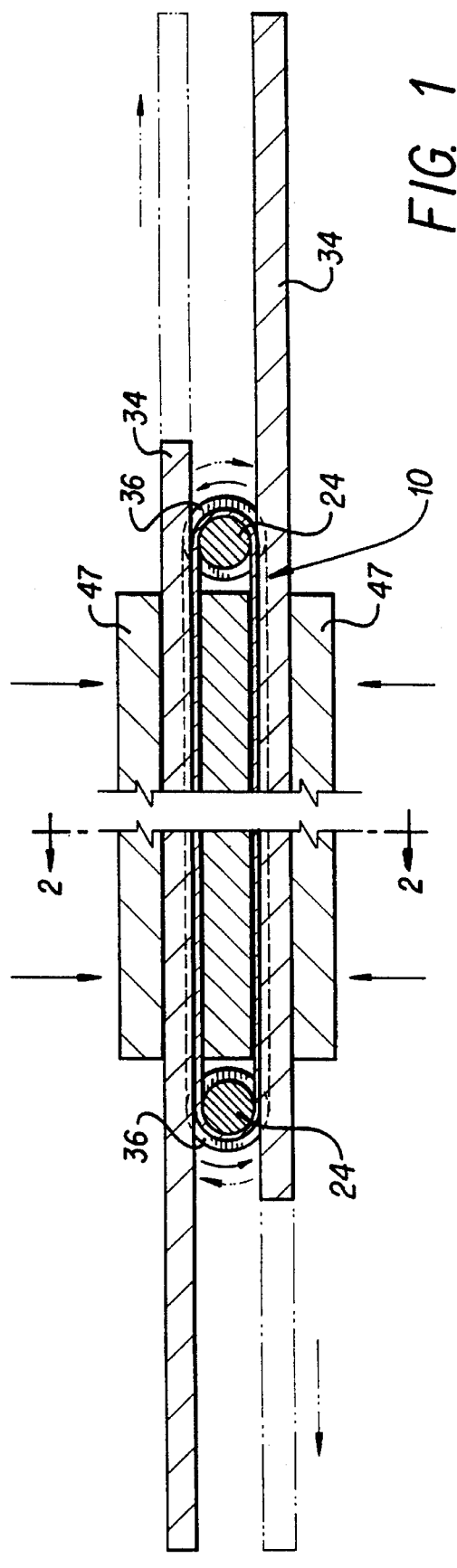
FIG. 1 is a cross section view of the entire belt-manufacturing device, with endless sleeves in place on roller guides.
Figure 2:
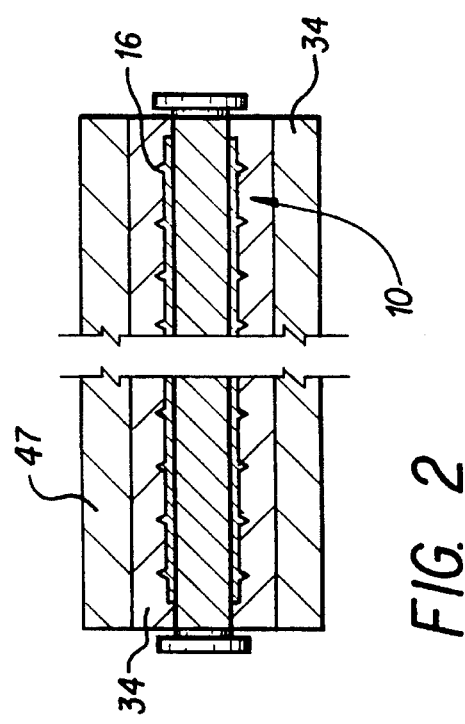
FIG. 2 is a cross section view drawn along line 2—2 of FIG. 1.
Figure 3:
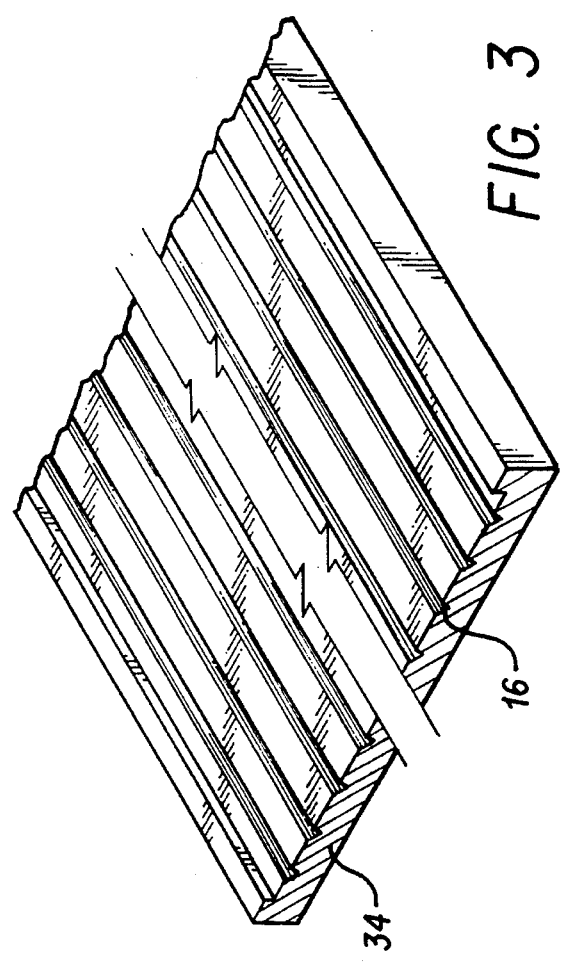
FIG. 3 is a partial perspective view of a mold.

The present invention includes a belt for use in machinery, an apparatus for use in manufacturing the belt, and a method of manufacturing the belt. The belt comprises a bilayer of amorphous, synthetic material and a resin-impregnated, underlying bilayer of woven fabric. The belt is molded to have a desired profile. The belt avoids loss of tension and exhibits tensile strength along both its length and breadth. A method of manufacture comprises molding the layers and profile in a single process in such a way that a single sets of molds can be used for molding a desired profile in a belt of a variety of lengths.

Referring to the drawings, the present invention includes a belt 10 which has a bilayer of amorphous, synthetic material 12 made endless by heat-fusion and a resin-impregnated, underlying bilayer of woven fabric 14. This synthetic material 12 is preferably urethane, neoprene, or hypalon. Because of the presence of this woven fabric 14, the belt 10 avoids loss of tension and exhibits tensile strength along both its length and breadth. The bilayer of synthetic material 12 in the belt 10 can be molded to have a desired profile 16. This profile 16 can enhance the belt 10 in a number of ways. For instance, tracking guides 18 can be molded in the belt 10. These tracking guides 18 can ensure the belt 10 functions properly in machinery, such as paper-handling machinery, in which it is used.

Figure 6:
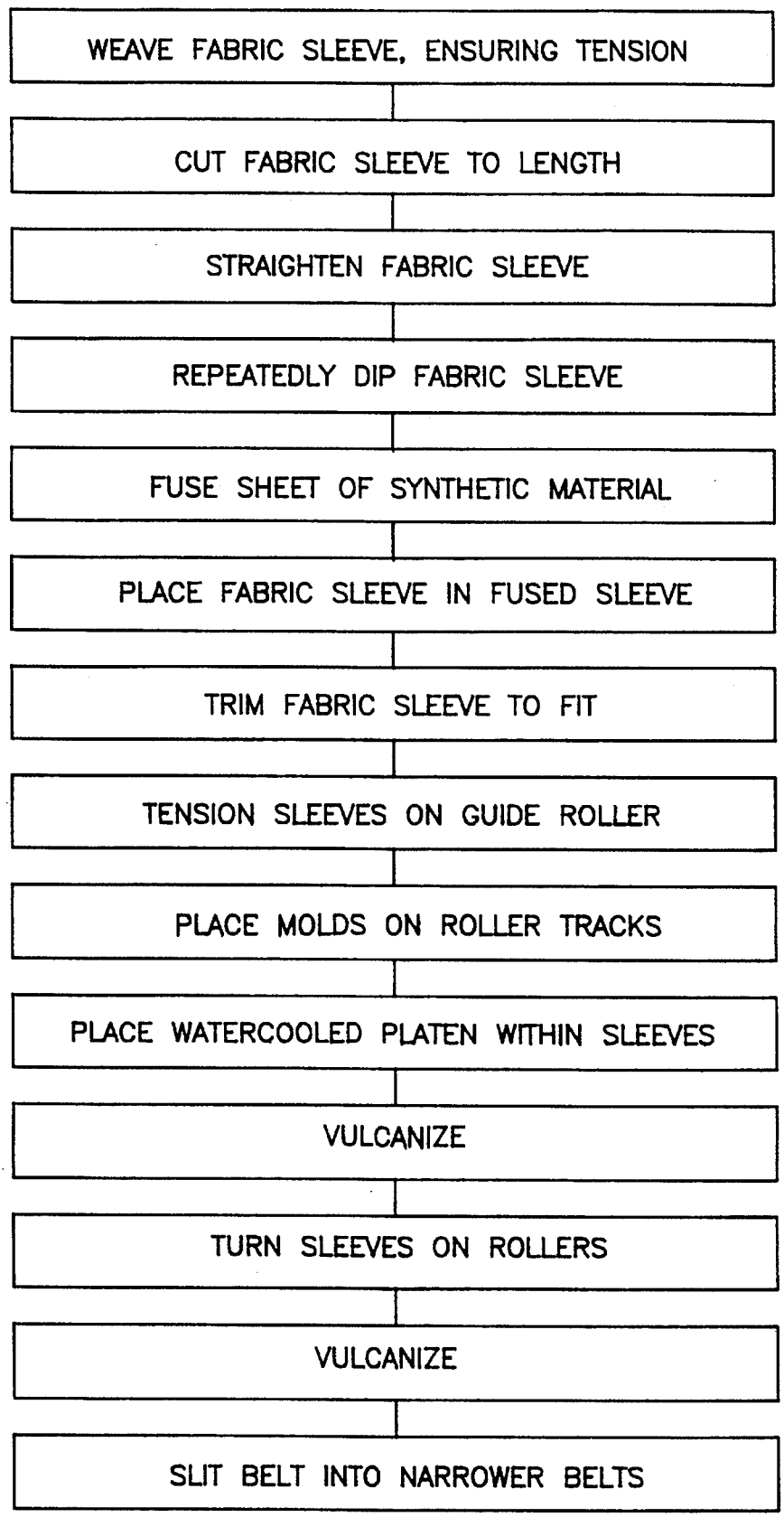
FIG. 6 is a flow chart indicating the steps of the inventive process.

A method of manufacture, as depicted in FIG. 6, of the belt 10 includes, generally, molding the layers 12, 14 and profile 16 in a single process in such a way that a single sets of molds 20 can be used for molding a desired profile 16 in a belt 10 of a variety of lengths. Specifically, the method comprises weaving an endless fabric sleeve 14, to a have a predetermined tension if stretched to an installed length. The sleeve is then cut to a predetermined length that is suitable for manipulation during the remaining steps of the method. If yarns 22 in the sleeve 14 are not straight, that is if the yarns 22 are not parallel or perpendicular to the length of the sleeve 14, then the yarns 22 of the sleeve 14 are straightened by wetting the sleeve 14 in a wetting agent (not shown), tensioning the sleeve 14 until straight using a tensioning device (not shown), and allowing the wetting agent to evaporate while the sleeve remains tensioned. The sleeve 14 is then repeatedly dipped in a solution of thermoplastic synthetic material 13, preferably urethane, neoprene, or hypalon, dissolved in a solvent (not shown). The dipping is performed until creating a thickness of synthetic material 13 indicative of a predetermined ratio of weight of synthetic material 13 to weight of fabric 14. Subsequently, a sheet of synthetic material 12 is heat fused to itself to form an endless sleeve of synthetic material 12 having an inner circumference. The fabric sleeve 14 is placed underneath and within the inner circumference of the sleeve of synthetic material 12, and one or both of the sleeves 12, 14 are trimmed as appropriate for molding.

While the sleeves 12, 14 are thus arranged, they are tensioned around a plurality of flanged guide rollers 24. In this way, an elongated oval shape 32 is formed from the sleeves 12, 14, with sides 28, 30 of the oval shape 32 opposing one another. Next, molds 34 are placed on opposing roller tracks 36 in such as way that they contact the opposing sides 28, 30 of the oval shape 32 formed from the sleeves 12, 14. Thereafter, a platen 38, preferably comprised by aluminum, is placed between said opposing sides 28, 30 of said oval shape 32. This platen 38 has ends 40, 42 that can optionally be water-cooled by transmission of cool water into water inlets 44, 46. This cooling is preferably performed when the synthetic material 12 is neoprene or hypalon.

A vulcanizing press 47 is applied to the sleeves 12, 14 while they are in the described position on the rollers 24, tracks 36, and platen 38 with the molds 34 for a predetermined length of time at a predetermined temperature, in order to bring about molding of the synthetic sleeve 12. Notable is the fact that molds 34 of a particular length can be used according to this method to mold endless sleeves of a lesser length. In this way, costs are reduced as compared to methods requiring multiple molds for multiple choices of belt lengths. Next, the sleeves 12, 14 are turned on the rollers 24 until unmolded portions of the sleeves 12, 14 are advanced away from the rollers 24. It is this turning that allows for molding of the entire synthetic sleeve or bilayer 12. After turning, the sleeves 12, 14 are stretched to a final length. For the purpose of this turning and this stretching, the sleeves 12, 14 rollers 24, tracks 36, molds 34 and platen 38 can be removed from the vulcanizing press 47. Importantly, the presence of the woven fabric 14 ensures that the sleeves 12, 14 are not distorted during application of the vulcanizing press 47.

After removal, the listed items are replaced, if applicable, and the vulcanizing press 47 is applied to the sleeves 12, 14, the rollers 24, the tracks 36, molds 34 and the platen 38 for a second predetermined length of time at a second predetermined temperature. At this point, the belt 10 is complete, although it may additionally be slit into a plurality of narrower belts with the same appearance as the belt 10, expect for reduced width. Moreover, further profiles 16 could be molded on the same belt 10 by application of additional, different molds 34. The net result is one or more belts molded with desirable profile, produce simply and inexpensively, especially as compared to other techniques, such as ones using a mold core for support of yarn.

It is to be understood that the present invention is not limited to the sole embodiment described above, but encompasses any and all embodiments within the scope of the following claims.

I claim:

1. A method for manufacturing a belt loop with a molded profile comprising the steps of:

weaving an endless fabric sleeve;

cutting said sleeve to a predetermined length;

repeatedly dipping said sleeve in a solution of thermoplastic synthetic material dissolved in a solvent;

heat fusing a sheet of synthetic material to form an endless sleeve of synthetic material having an inner circumference;

placing said fabric sleeve underneath and within said inner circumference of said sleeve of synthetic material;

tensioning said synthetic material sleeve and said fabric sleeve around a plurality of flanged guide rollers, said tensioning forming an elongated oval from said sleeves, with sides of said oval opposing one another;

placing molds on opposing roller tracks;

placing said synthetic material sleeve, said fabric sleeve, and said rollers between said molds, with said rollers engaging said roller tracks;

placing a platen between said opposing sides of said oval, said platen having ends;

applying a vulcanizing press to said sleeves, said rollers, said tracks, and said platen for a predetermined length of time at a predetermined temperature;

turning said sleeves on said rollers until an unmolded portion of said sleeves is advanced away from said rollers;

stretching said sleeves to a final length;

again applying a vulcanizing press to said sleeves, said rollers, said tracks, and said platen for a second predetermined length of time at a second predetermined temperature.

2. A method according to claim 1, further comprising the step of ensuring that said fabric sleeve is woven to a have a predetermined tension if stretched to an installed length.

3. A method according to claim 1, wherein said fabric sleeve is comprised by yarns and further comprising the step of straightening said sleeve immediately after cutting said sleeve to a predetermined length, by:

wetting said sleeve in a wetting agent, tensioning said sleeve straight in a tensioning device, and allowing said wetting agent to evaporate while said sleeve remains tensioned.

4. A method according to claim 1, wherein said repeated dipping is performed until creating a thickness of synthetic material indicative of a predetermined ratio of weight of synthetic material to weight of fabric.

5. A method according to claim 1, wherein said fabric sleeve is trimmed subsequent to placement underneath said synthetic material sleeve.

6. A method according to claim 1, wherein said platen is aluminum.

7. A method according to claim 1, wherein said sleeves, said rollers, said tracks, and said platen are removed from said vulcanizing press prior to said turning.

8. A method according to claim 1, wherein said sleeves are slit into a plurality of narrower belts after again applying said vulcanizing press.

9. A method according to claim 1, wherein said synthetic material is selected from a group consisting of urethane, neoprene and hypalon.

10. A method according to claim 9, wherein said ends of said platen are water-cooled.

11. An apparatus for performing the method according to claim 1, comprising:

weaving implements;

cutting implements;

flanged guide rollers capable of turning;

opposed roller tracks;

profile molds engagingly placeable on said opposing roller tracks;

a platen having ends;

a vulcanizing press capable of containing said rollers, said tracks, and said platen for a predetermined length of time at a predetermined temperature; and sleeve-stretching implements.

12. An apparatus according to claim 11, further comprising sleeve-straightening implements.

13. An apparatus according to claim 11, wherein said ends are water-cooled.

14. An apparatus according to claim 11, wherein said platen is aluminum.

15. A durable, non-stretching belt manufactured according to the method of claim 1, comprising:

a layer of woven fabric, said fabric having been impregnated with a synthetic, amorphous material and straightened and stretched to a final length;

a layer of synthetic, amorphous material disposed on said fabric, said synthetic, amorphous material having been stretched to a final length.

16. A belt according to claim 15, wherein said synthetic, amorphous material is selected from the group consisting of urethane, neoprene and hypalon.

17. A belt according to claim 15, wherein said layer has been molded to have a profile.

* * * * *